United States Patent [19]

Ochi

[11] Patent Number: 4,644,390
[45] Date of Patent: Feb. 17, 1987

[54] PHOTOELECTRIC SENSOR ARRAY SUPPORT PACKAGE

[75] Inventor: Shigeharu Ochi, San Jose, Calif.

[73] Assignee: Fuji Photo Film Co. Ltd., Kanagawa, Japan

[21] Appl. No.: 672,641

[22] Filed: Nov. 19, 1984

[51] Int. Cl.[4] ............................................. H04N 9/09
[52] U.S. Cl. ........................................ 358/50; 358/55; 358/229
[58] Field of Search ................. 358/41, 43, 50, 51, 358/52, 55, 213, 225, 229

[56] References Cited

U.S. PATENT DOCUMENTS

| 3,975,760 | 8/1976 | Yamanaka et al. | 358/41 |
|---|---|---|---|
| 4,106,056 | 8/1978 | Nagumo et al. | 358/50 |
| 4,166,969 | 9/1979 | Hoeberechts | 358/43 X |
| 4,238,765 | 12/1980 | Nagumo | 358/43 |
| 4,249,203 | 2/1981 | Yamanaka | 358/50 |
| 4,264,921 | 4/1981 | Pennington et al. | 358/50 |
| 4,275,412 | 6/1981 | Contant | 358/55 |
| 4,323,918 | 4/1982 | Bendell | 358/50 |
| 4,369,459 | 1/1983 | Iwasawa et al. | 358/50 |
| 4,415,924 | 11/1983 | Kawabata et al. | 358/50 |
| 4,546,380 | 10/1985 | Knop | 358/43 |

FOREIGN PATENT DOCUMENTS

| 0014679 | 1/1983 | Japan | 358/55 |
|---|---|---|---|
| 0123279 | 7/1983 | Japan | 358/43 |
| 0210763 | 12/1983 | Japan | 358/229 |

Primary Examiner—Margaret A. Focarino
Attorney, Agent, or Firm—Sughrue, Mion, Zinn, Macpeak and Seas

[57] ABSTRACT

A photoelectric sensor array support package for use in a multiple sensor solid state color television camera, supports two soild state photoelectric sensors. The support package is L-shaped with one sensor array mounted in the package base, the other in the package leg. The sensor arrays are aligned to each other in the package before it is incorporated into the television camera. The camera lens system and thus the object image beam is aligned to the prealigned sensors in the support package after the package is placed in the camera.

5 Claims, 7 Drawing Figures

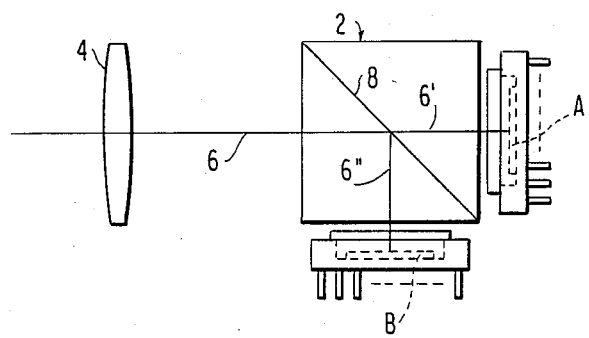
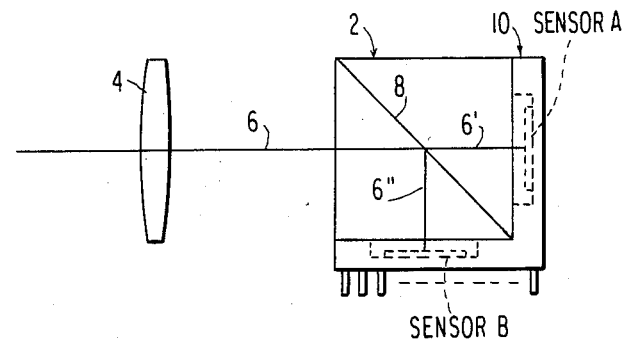
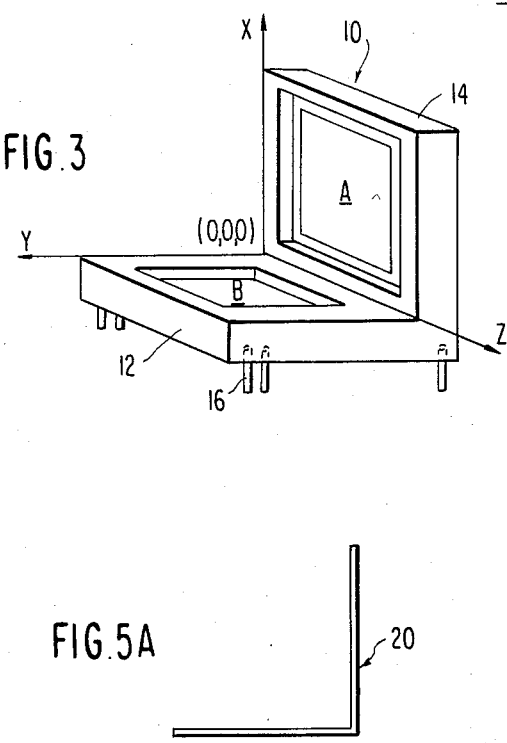
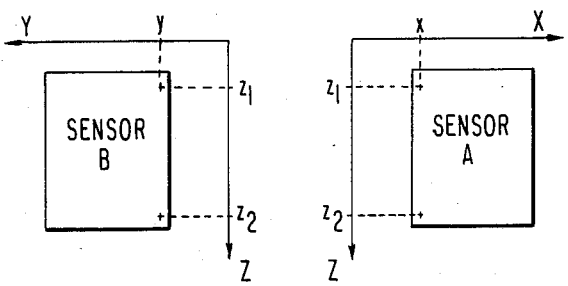
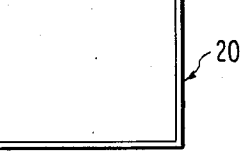
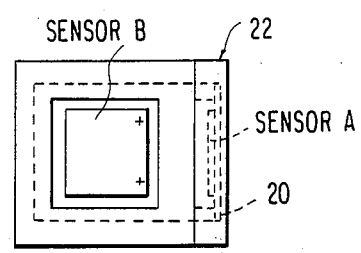
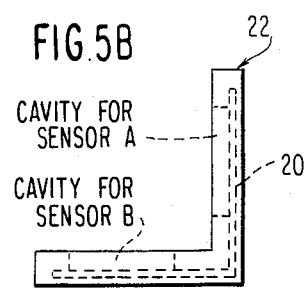

PHOTOELECTRIC SENSOR ARRAY SUPPORT PACKAGE

FIELD OF THE INVENTION

The invention is in the field of solid state image pickup devices such as solid state cameras and more particularly in the field of color television cameras using multiple solid state imaging arrays.

BACKGROUND OF THE INVENTION

In recent years much interest has developed in solid state television cameras. These cameras use solid state sensors or imaging arrays, as they are sometimes termed, of photodiodes, charge coupled devices (CCD), bucket brigade devices (BBD) or other solid state, photoelectric transducers instead of the well-known vidicon tube. Each array is composed of a row and column matrix of photoelectric transducers to define a matrix array of photoelectric cells. Light from the object being imaged, impinges on the cells of the solid state imaging array, the cells being successively sampled by sampling pulses to produce electrical signals corresponding to the intensity of the light received by each of the array cells. In a color camera system, multiple solid state imaging arrays are used, with two or three arrays being the norm. In a two array system, it is known to produce two images of the object each containing light of only selected wave lengths using suitable prisms, dichroic mirrors, or filters, along with lens, mirrors and half mirrors. In this way, a first image may contain only the green light from the object and the second image its red and blue light. The green light is received by one of the two imaging arrays, while the red and blue light is received by the other imaging array. The cells of the arrays being CCD, BBD, photodiode or similar photoelectric devices, are sampled by sampling pulses to produce electrical signals proportional to the intensities of the green light and red/blue light received by the cells of the first and second array, respectively. These electrical signals are processed in conventional processing equipment to produce encoded signals representing the green, red and blue components of the object, for transmission to a compatible receiver where the encoded signals are decoded and the image of the object is reconstructed. It should be apparent and it is indeed well-known, that high resolution of the reconstructed image requires proper registration of corresponding cells of the two arrays.

It is also known to construct a solid state color television camera with three solid state imaging arrays, each consisting of a matrix of photoelectrical cells. As with the two array system, the three array system uses systems of prisms, filters, or dichroic mirrors along with suitable lens mirrors and half mirrors, to produce multiple images of an object, each image being of a selected color. For example, a first image might contain only the green components of the object, the second image only the red components, and the third image only the blue components. Light of the selected colors impinge a respective array where, in response to sampling pulses, the light is converted into electrical signals corresponding to the intensities of the green, red and blue light received by the cells of the first, second and third solid state imaging arrays, respectively. These electrical signals are encoded for transmission to a receiver where an image of the object is reconstructed.

Thus, the image of the object is broken down into a very large number of picture points or pixels and each point is divided into its primary color components. In solid state imaging, each cell of an array coincides with a picture point. When multiple arrays are provided for color transmission, corresponding cells in the different arrays define the color and intensity for each picture point. These corresponding cells must be maintained in a stringently defined positional relationship relative to each other to achieve optimum resolution.

This requirement of stringent alignment in color television cameras using multiple solid state imaging arrays has proven very difficult and often costly to satisfy. U.S. Pat. No. 3,975,760 which issued Aug. 17, 1976 to Yamanaka et al describes a multiple array solid state camera, each imaging array being composed of a matrix of CCDs, each CCD being considered a picture element. FIG. 5 of that patent illustrates a color camera apparatus in which the light image of an object is projected through a lens, half mirrors and mirrors to produce three images of the object. Each image passes through a different optical color filter positioned in front of a respective imaging array, the imaging arrays being formed on different chips. In this manner, each color image impinges on a different array, and the color intensity information at each picture element of the each array is read out and processed. Yamanaka et al recognized that the resultant video signal, which is the combination of the video signals produced by each array gave rise to base band and side band components which under certain circumstances gave rise to sampling error. This sampling error causes flicker in the picture reproduced from the resultant video signal. Yamanaka et al further found that this sampling error could be eliminated by very precisely locating one solid state array relative to another in the horizontal direction.

This task of precisely locating the arrays proved very formidable to Yamanaka et al. In U.S. Pat. No. 4,249,203 which issued Feb. 3, 1981 to Yamanaka, it is recognized that with a solid state array with several hundreds of picture elements (CCDs) in the horizontal direction it is extremely difficult to provide the necessary mechanical positioning of several arrays, each array being on a different chip. In Yamanaka, mechanical alignment of solid state arrays is abandoned for a complex and costly electronic alternative.

The requirement for accurate positioning of solid state imaging arrays exists not only in the limited situation of Yamanaka et al and Yamanaka where very precise horizontal displacements are needed to eliminate sampling error, but in general for it is necessary to position plural sensors in very specifically defined X, Y and angular positions relative to the image beam to correctly reconstitute the color image. If there is lateral, vertical or angular skew, the image on one image sensor will not superimpose exactly on the image of the others.

When the solid state imaging arrays of a color television camera are located in the manner illustrated in FIG. 2 of U.S. Pat. No. 4,415,924, which issued Nov. 15, 1983, to Kawabata, the positioning problem is very acute and can be practically solved only by the use of complex and expensive electronic solutions or through the use of specifically designed and expensive photoelectrical transducers such as those disclosed in the Kawabata patent.

It is known to modify the Kawabata positioning of multiple sensors and locate two sensors on a single printed circuit board. For this arrangment, reference is made to FIG. 5 of U.S. Pat. No. 4,369,459 to Iwasawa et al. In U.S. Pat. No. 4,264,921 to Pennington et al it is recognized that positioning plural arrays on a single chip or locating plural arrays on a single substrate simplify the task of aligning multiple sensors of a multiple sensor color facsimile apparatus.

SUMMARY OF THE INVENTION

The present invention describes another technique for simplifying the alignment of the multiple sensors of a multiple sensor camera without requiring the sensors to be on a common semiconductor chip or even in a common plane.

The necessary critical alignment of multiple solid state sensors of a solid state television camera is more easily realized by prepackaging the sensors in a sensor support package prior to incorporating the sensors into the camera structure. This facilitates aligning the sensors to the object image, for the sensors are already aligned to each other. The sensor support package of the invention locates the solid state sensors at a defined angle relative to one another, with an angle of ninety degrees being preferable. This ninety degree arrangement defines an L-shaped package, which can accommodate two sensors, one in the base of the L, the other in its leg. The sensors are fabricated on conventional dies or chips which are provided with alignment marks. Conventional chip alignment techniques using microscopes and the alignment marks may be used to position the two sensors vertically, horizontally and angularly so that the image received on one sensor can be superimposed on the image received by the other sensor. A further advantage to the L-shaped package is that it permits a prism block providing beam splitting to function as a cover glass eliminating the necessity of a separate cover glass.

BRIEF DESCRIPTION OF THE DRAWINGS

FIG. 1 illustrates a conventional arrangement of sensors in a two array, multiple sensor array solid state television camera.

FIGS. 2 and 3 illustrate a preferred embodiment of the photoelectric sensor array support package according to the teachings of this invention.

FIG. 4 illustrates an alignment procedure for two sensors mounted in the support package illustrated in FIGS. 2 and 3.

FIGS. 5A-5C illustrate several stages which the support package of the invention passes through during its manufacture.

DETAILED DESCRIPTION OF THE PREFERRED EMBODIMENT

As explained previously herein, conventional multiple imaging array (sensor) television cameras make use of two or three sensors, with associated prisms, mirrors, half mirrors and filters to split the object image beam into two or three images, each containing only selected wavelengths of the object image beam. For example, FIG. 1 illustrates a conventional two sensor system for a television camera. This two sensor system is comprised of sensor A, sensor B, prism 2, and lens 4. An object image beam 6 is focused by lens 4 onto prism 2. Prism 2 contains a half mirror surface 8 whereby beam 6 is split into beam 6' which is transmitted through surface 8 to sensor A and beam 6", which reflected from surface 8 to sensor B. Since sensors A and B are on separate supports, each having several degrees of freedom, many potential alignment errors exist.

Several potential alignment errors are eliminated according to the teachings of this invention by packaging the sensors A and B in a rigid support package and aligning the sensors relative to each other within the rigid support package prior to incorporating the sensors into the camera. The sensor support package is designed to locate and hold the two aligned sensors at a defined angle relative to each other. This angle is preferably ninety degrees, which permits a cubic prism block to provide the dual functions of beam splitter and cover plate. Additionally, this prism block facilitates focusing of the beams onto the sensors.

FIGS. 2 and 3 illustrate the preferred package according to the teachings of the invention. FIG. 2 is a side view of the package showing the prism block in place, while FIG. 3 is a perspective view of the package illustrated in FIG. 1, without the prism block. Die bonding pads are not shown for simplicity.

Referring specifically to FIGS. 2 and 3, the support package 10 includes a base portion 12 and a leg portion 14. Sensor A, fabricated on a first semiconductor chip, is mounted to a suitable support (not shown) in leg portion 14, while sensor B, fabricated on another semiconductor chip, is mounted to a suitable support (not shown) in base portion 12. Contact pins 16 extend from the sensors to provide electrical interconnection between sensors A and B and the camera processing and encoding circuitry. The base 12 of the package 10 is illustrated as being located at an angle of 90° relative to the leg portion 14. Thus, the package can be visualized as being located in an X,Y,Z coordinate system, with the base portion 12 lying in the YZ plane, and the leg portion lying in the XZ plane as illustrated in FIG. 3.

It should be understood that the teachings of this invention are not limited to a photoelectric sensor support package accommodating only two photoelectric sensors or to a photoelectric sensor package accommodating two sensors at ninety degrees. The teachings of this invention include positioning, aligning and mounting sensors in a sensor package at angles other than ninety degrees prior to incorporation of the sensors into the camera.

In FIG. 2, the beam splitting prism 2 is illustrated in place as a cover plate. As with the prior art arrangement, object image beam 6 focused by lens 4 is received by the prism 2 having a half-mirror or dichroic-mirror surface 8. The beam 6 from lens 4 is split into transmitted beam 6' for transmission to sensor A, and into reflected beam 6" for transmission to sensor B. Suitable filters (not shown), such as green filters and red/blue filters may, if necessary, be positioned in the package, between the prism 2 and the sensors. It is to be understood that the lens 4 is not a part of the sensor package 10 but rather constitutes an element of the camera. on incorporating the support package 10 into the camera, it is aligned to the camera lens and thus to the object image beam 6. Since the sensors have previously been aligned to each other in packages, the final alignment of the object beam to the sensor package 10 and thus to the sensors is a relatively simple procedure.

FIG. 4 illustrates one example of the alignment of sensor A to sensor B in sensor support package 10. The chip carrying sensor A is shown with two alignment markings, designated by coordinates $XZ_1$ and $XZ_2$. The chip carrying sensor B is shown with two alignment markings $YZ_1$ and $YZ_2$. Of course, different or additional alignment markings may be used. With sensor A mounted in leg portion 14 and sensor B mounted in base portion 12, the sensors are moved under microscopic observation, until mark $YZ_1$ aligns to the $YZ_1$ coordinates of a reference scale and marks $YZ_2$, $XZ_1$ and $XZ_2$ likewise align to corresponding coordinates of the reference scale.

Fabrication of the sensor package 10 can be simple and inexpensive. FIGS. 5A–5C illustrate the preferred fabrication steps for forming a two sensor package. The package 10 has as its main support structure an L-shaped metal sole plate 20. This metal plate 20 may form the surface to which the sensor chips carring sensors A and B are attached. A ceramic or plastic moulding 22 surrounds the sole plate 20. Contact pins and conductive leads to bonding pads are not shown. Sensors A and B are then mounted and aligned on the package. Sole plate 20 can also be used as a conductor to die substrates.

What is claimed is:

1. A photoelectric sensor array support package comprising:
    a base portion,
    a leg portion, rigidly connected to the base portion at a selected angle,
    means in said base portion to fixedly attach a photoelectric sensor array in said base portion,
    means in said leg portion to fixedly attach a photoelectric sensor array in said leg portion and;
    a beam splitting prism means attached to said base and leg portions whereby said prism means is a cover glass in addition to being a beam splitting mechanism.

2. A photoelectric sensor array support package as claimed in claim 1, wherein said selected angle is 90°.

3. A photoelectric sensor array support package as claimed in claim 2, wherein said base and leg portions are formed from an L-shaped metal sole plate, and wherein said metal sole plate is at least partially covered by a moulding of insulation material.

4. A photoelectric sensor array support package as claimed in claim 3, wherein said insulation material is ceramic.

5. A photoelectric sensor array support package as claimed in claim 3, wherein said insulation material is plastic.

* * * * *